3,079,350
POLYURETHANE FOAMS AND POLYESTERS FOR PREPARATION THEREOF

Carl Bernstein, Deerfield, Ill., assignor, by mesne assignments, to Witco Chemical Company, Inc., New York, N.Y., a corporation of Delaware
No Drawing. Filed Sept. 23, 1957, Ser. No. 685,385
18 Claims. (Cl. 260—2.5)

This invention relates to improvements in flexible polyurethane foams or foamed bodies which have particular utility in applications involving the properties of absorption and retention of water. The term "flexible," as used herein, relates to foams or foamed bodies which are resilient or deformable or readily squeezable by the hand, particularly when wetted by water.

Flexible polyurethane foams, which are usable like sponges, are well known articles of commerce and are conventionally prepared by reacting polyesters with organic polyisocyanates in the presence of limited amounts of water. Typical of such flexible polyurethane foams are those prepared from (a) polyesters derived, for instance, from the interaction of a glycol or polyglycol, such as ethylene glycol or diethylene glycol, and adipic acid or other dicarboxylic acid, sometimes in the presence of a small proportion of a polyol containing at least 3 hydroxy groups such as trimethylol propane for cross-linking purposes, (b) a polyisocyanate, usually a diisocyanate, such as tolylene diisocyanate, and (c) a small amount of water, the reaction being carried out in the presence of a coupling agent or emulsifier and an amine catalyst.

The flexible polyurethane foams of the type described above have a number of desirable properties and characteristics. They suffer, however, from inadequate water-retention properties. When used, for instance, in the manner of sponges, to wipe up and absorb water from a wet surface, they are deficient in their absorbent characteristics and, also, in relation to the amount of water which they are able to hold. Other polyurethane foams, while having appreciable water-retention properties, suffer marked defects in regard to tear resistance, particularly when wetted with water.

I have discovered that marked improvements can be made in the water-retention properties of polyurethane foams deficient in relation thereto by utilizing, as the polyester constituent, a mixture of polyesters derived from glycols selected from two different groups, one of said groups comprising glycols having a molecular weight between 62 and 150, and the other of said groups comprising polyethylene glycols having an average molecular weight between 200 and 1000. The polyester mixture can be prepared by first producing separately the polyester of each group and then intermixing them in proper proportions, as hereinafter pointed out, or, alternatively, the glycols and polyglycols, of the two groups, can be admixed and then reacted with the dicarboxylic acid to produce the polyester mixture. It is particularly preferred to produce, separately, the polyester from each group and then admix them, since the resulting polyester mixtures produce polyurethane foams which are particularly efficacious from the standpoint of their water-retentive properties. The polyurethane foams made pursuant to my invention are also characterized by excellent tear strength in either the dry or water-wet state.

The glycols which fall into the first group, namely, those having a molecular weight between 62 and 150, include, for instance, ethylene glycol; propylene glycol-1,2; propylene glycol-1,3; butylene glycol-1,4; butylene glycol-1,3; butylene glycol-2,3; dipropylene glycol; diethylene glycol; and triethylene glycol. Of particular utility is diethylene glycol. Mixtures of two or more of said first group glycols can be used with good results.

The polyethylene glycols which fall into the second group, namely, those having an average molecular weight between 200 and 1000, may be represented by the formula $HO-(C_2H_4O)_n-C_2H_4-OH$ where $n$ is in excess of 3 and up to 21, especially from 7 to 12. Of particular utility are those polyethylene glycols having an average molecular weight of 300 to 600 and especially 400 or 400 to 600. Typical illustrations of such polyethylene glycols are those sold under the trade names Polyglycol 200, Polyglycol 300, Polyglycol 400, Polyglycol 600, etc., with the number following the Polyglycol designation designating the average molecular weight thereof. Polyglycol 400, as stated, is especially useful and its employment represents an important, though limited, embodiment of the present invention. Mixtures of two or more of said second group of polyethylene glycols can be used with good results.

In the production of the polyester compositions of the present invention utilized to produce the novel flexible polyurethane foams, the glycols of the first group and the polyethylene glycols of the second group are each individually (or, as stated above, a mixture of a glycol from the first group and a polyethylene glycol from the second group) reacted with a dicarboxylic acid containing from 3 to 10 carbon atoms. Among such dicarboxylic acids which can be utilized in making said polyesters are adipic acid, malonic acid, maleic acid, succinic acid, fumaric acid, glutaric acid, pimelic acid, suberic acid, azelaic acid, sebacic acid, isosebacic acid, tartaric acid, maleic acid, phthalic acid, terephthalic acid, isophthalic acid, and the like. Adipic acid is especially satisfactory. Mixtures of two or more of said dicarboxylic acids can, of course, be utilized. No special techniques are required so far as the mode of procedure is concerned in the production of the polyesters, conventional polyester esterification practices being employed.

In the production of said polyesters, there may be included, during the esterification of the glycol or mixture of the glycol and polyethylene glycol, a small proportion of a polyol as, for example, glycerol, sorbitol, mannitol, pentaerythritol, diglycerol, triglycerol, triethanolamine, trimethylol propane, triethylol propane, hexanetriols, or the like. This serves to enable some cross linking to occur and makes for a somewhat stiffer flexible polyurethane foam. The amount of triol utilized should not be unduly large as this tends to produce polyesters which, when converted into polyurethane foams, are too hard and insufficiently flexible to function properly for the purposes of my present invention. In general, where the polyols are used, it is advantageous that they do not exceed about 10%, and, better still, fall within the range of 4% to 8% by weight of the total of the glycol of the first group and polyethylene glycol of the second group.

The proportions of the different polyesters in the polyester compositions made in accordance with my invention, while somewhat variable, will lie within the range in which the polyester made from the polyethylene glycols of molecular weight from 200 to 1000 (namely, the second group of glycols) constitutes from 10% or 15% to 50%, and especially from 20% to 40%, by weight of the polyester composition. In terms of weight percentage on the polyester composition, the polyethylene glycols of molecular weight 200 to 1000 will, in general, constitute from 5% to 35%, particularly 10% to 20% or 10% to 30%.

The organic diisocyanates, the tertiary amine catalysts, the emulsifying agents, the proportions thereof, the proportions of water, and the procedural techniques involved in the production of the polyurethane foams from my novel polyester compositions are known in the art and are disclosed in numbers of patents and other publications. Among such organic diisocyanates are, for instance, tolylene diisocyanate (in commercial form it is usually a mixture containing about 80% of the 2,4 isomer and 20% of the 2,6 isomer), hexamethylene diisocyanate and P-phenylene diisocyanate. Among the tertiary amine catalysts are N-ethyl morpholine, trimethyl amine and triethylamine. Among the emulsifying agents, which may be of anionic or nonionic character, may be mentioned ethylene oxide reaction products with sorbitan esters such as sorbitan monooleates, sorbitan monostearate and sorbitan monopalmitate; ethylene oxide reaction products with alkyl phenols; and mixed emulsifiers such as those sold under the designation Witco 77–86 by Witco Chemical Company. Reference may be made to such patents as No. 2,779,689 for disclosures of other organic diisocyanates, catalysts, emulsifying agents, proportions of reactants to produce the polyurethane foams, and for other information generally concerning known techniques of producing the said foams from polyesters. Other patents disclosing methods of producing polyurethane foams include, for instance, Nos. 2,785,739; 2,787,601 and 2,788,335, and the foaming techniques disclosed therein can broadly be utilized in forming the polyurethane foams from the novel polyester compositions of my invention. The finished polyurethane foams of my invention are conveniently shaped in the form of conventional bodies of regular parallelopiped shape or in any other desired configuration to be used in the same manner as present foam rubber or sponge bodies for household and similar use. As a result of the use of the novel polyester compositions of my invention, the polyurethane foams produced therefrom possess the improved properties and characteristics referred to above.

The following examples are illustrative of the preparation of polyester compositions in accordance with my invention and the production of polyurethane foams therefrom. It will be understood that said examples are not to be construed as limitative of my invention since various changes can readily be made in the light of the guiding principles and teachings provided herein.

*Example 1*

(a) 2640 pounds of diethylene glycol and 3372 pounds of adipic acid are heated to 480° F., with stirring and under an inert atmosphere, and maintained at such temperature, while allowing the water of reaction to escape, until an acid number of 25 to 30 is reached. Thereupon 100 pounds of trimethylol propane are added and the reaction mixture is maintained at about 480° F. until an acid number of about 2 is reached. The resulting polyester has a hydroxyl number of about 60 and an approximate viscosity of 12,000 cps. at 25° C.

(b) 3330 pounds of polyethylene glycol 400 and 1216 pounds of adipic acid are heated to 480° F., with stirring and under an inert atmosphere, and maintained at such temperature, while allowing the water of reaction to escape, until an acid number of about 20 is reached. Thereupon 125 pounds of trimethylol propane are added and the reaction mixture is maintained at about 480° F. until an acid number of about 2 is reached. The resulting polyester has a hydroxyl number of about 50 and an approximate viscosity of 10,000 cps. at 25° C.

(c) Mixtures of the (a) and (b) polyesters are made, as shown below, in the stated percentages by weight.

(1) 90% of (a) and 10% of (b)
(2) 80% of (a) and 20% of (b)
(3) 70% of (a) and 30% of (b)
(4) 67% of (a) and 33% of (b)
(5) 60% of (a) and 40% of (b)
(6) 50% of (a) and 50% of (b)

It may be noted, for instance, that the polyethylene glycol 400 constitutes 13.1%, by weight, of the (2) polyester; 21.8% of the (4) polyester; and 33.5% of the (6) polyester.

(d) Polyurethane foams are made from each of polyester mixture (1) to (6), inclusive, of part (c) of this Example 1, as well as from the polyesters of each of parts (a) and (b) of this example, all in accordance with the following formulation and following the usual and conventional polyurethane foam production techniques:

| | Parts by weight |
|---|---|
| Polyester | 100.0 |
| Tolylene diisocyanate (80% 2,4 isomer and 20% 2,6 isomer, sold under trade name "Hylene TM") | 46.0 |
| Emulsifier (Witco 77–86) | 3.0 |
| N-ethyl morpholine | 1.6 |
| Water | 3.1 |

The following table illustrates the properties of various of the polyurethane foams made as described above in relation to a typical commercial polyurethane foam made from a diethyiene glycol-adipic acid polyester:

| Polyurethane Foam "Sponge" | Water Retention[1] Per Gram of "Sponge" | Tear Resistance | |
|---|---|---|---|
| | | Dry | Wet |
| Made from polyester (2) of part (c) of Example 1. | 24.3 | Very good | Very good. |
| Made from polyester (4) of part (c) of Example 1. | 23.4 | ----do---- | Do. |
| Made from polyester (6) of part (c) of Example 1. | 19.9 | Good | Fair. |
| Typical commercial polyurethane foam "sponge" made from diethylene glycoladipic acid polyester. | 14.7 | Very good | Very good. |

[1] The water retention test was carried out by placing the previously weighed dry "sponge" under water and, while maintaining it under water, squeezing it and releasing it three times. After being released the third time, it was kept under water for an additional 20 seconds. It was then removed from the water and the water was allowed freely to drain from the "sponge" for 15 seconds. The "sponge" was thereupon immediately placed in a tared beaker and weighed.

In general, in the production of the polyester foams the proportions of th ingredients will usually fall within the following ranges of proportions by weight, to each other:

| | |
|---|---|
| Polyester composition | 100 |
| Diisocyanate | 25 to 75 |
| Emulsifier | 1 to 4 |
| Catalyst | 0.5 to 3 |
| Water | 1 to 5 |

The polyurethane foams of my present invention can also be made through the prepolymer route, that is, prepolymers can be made from my novel polyester compositions and the resulting prepolymers can then be admixed with the remaining constituents of the polyurethane foam formulation and foamed in accordance with standard foaming techniques and procedures. A typical example of such a prepolymer can be made as follows, the parts mentioned being by weight.

*Example 2*

(a) To 100 parts of a polyester composition (for instance, any of the polyester compositions in part (c) of Example 1), 45 parts of tolylene diisocyanate are added (which, in accordance with conventional practice, comprises a mol excess in relation to the polyester composition so as to provide free —NCO groups), with stirring and under a nitrogen atmosphere, until the exothermic reaction subsides. The reaction mixture is then warmed to 90° C. and held at this temperature for one hour and then allowed to cool.

(b) The prepolymer produced in part (a) of Example 2 can be converted into a polyurethane foam by adding thereto 3 parts of emulsifier, for instance, Witco 77–86, 1.6 parts of N-ethyl morpholine, and 3.3 parts of water, rapidly stirring the mixture for about 15 seconds or unti foaming just starts, and then pouring the mixture into a mold.

What I claim as new and desire to protect by Letters Patent of the United States is:

1. A new and useful polyester composition having particular utility for the production of flexible polyurethane foams having improved water-retentive properties comprising a mixture of polyesters derived from glycols selected from two different groups as herein specified, the first of said groups comprising glycols having a molecular weight between 62 and 150, and the second of said groups comprising polyethylene glycols having an average molecular weight between 200 and 1000, each of said esters comprising a reaction product of the specified glycol with dicarboxylic acid containing from 3 to 10 carbon atoms, the polyester of said second group of glycols constituting from 10% to 50%, by weight, of said polyester composition.

2. A new and useful polyester composition having particular utility for the production of flexible polyurethane foams having improved water-retentive properties comprising a mixture of polyesters derived from glycols selected from two different groups as herein specified, the first of said groups comprising glycols having a molecular weight between 62 and 150, and the second of said groups comprising polyethylene glycols having an average molecular weight between 300 and 600, each of said esters comprising a reaction product of the specified glycol with dicarboxylic acid containing from 3 to 10 carbon atoms and with up to 10% by weight of the aforesaid glycols of polyol having at least 3 hydroxy groups, the polyester of said second group of glycols constituting from 10% to 50%, by weight, of said polyester composition.

3. A new and useful polyester composition having particular utility for the production of flexible polyurethane foams having improved water-retentive properties comprising a mixture of polyesters one of which is derived from diethylene glycol and the other of which is derived from polyethylene glycols having an average molecular weight between 400 and 600, each of said esters comprising a reaction product of the specified glycol with adipic acid and up to 10% by weight of the aforesaid glycols of trimethylol propane, the polyester of said second group of glycols constituting from 20% to 40% by weight, of said polyester composition.

4. A new and useful polyester composition having particular utility for the production of flexible polyurethane foams having improved water-retentive properties comprising a mixture of polyesters derived from glycols selected from two different groups as herein specified, the first of said groups comprising glycols having a molecular weight between 62 and 150, and the second of said groups comprising polyethylene glycols having an average molecular weight between 300 and 600, each of said esters comprising a reaction product of the specified glycol with aliphatic dicarboxylic acid containing from 3 to 10 carbon atoms and up to 10% by weight of the aforesaid glycols of polyol having at least 3 hydroxy groups, the said second group of glycols constituting from 5% to 35% by weight, of said polyester composition.

5. A new and useful polyester composition having particular utility for the production of flexible polyurethane foams having improved water-retentive properties comprising a mixture of polyesters one of which is derived from diethylene glycol and the other of which is derived from a polyethylene glycol having an average molecular weight of about 400, each of said esters comprising a reaction product of the specified glycol with adipic acid and up to 10% by weight of the aforesaid glycols of trimethylol propane, the said second-mentioned polyethylene glycol constituting from 10% to 20%, by weight, of said polyester composition.

6. A new and useful polyester mixture having particular utility for the production of flexible polyurethane foams having improved water-retentive properties comprising polyesters derived from dicarboxylic acid containing from 3 to 10 carbon atoms and a mixture of glycols selected from two different groups as herein specified, one of said groups comprising glycols having a molecular weight between 62 and 150, and the other of said groups comprising polyethylene glycols having an average molecular weight between 200 and 1000, said last-mentioned polyethylene glycols constituting from 5% to 35%, by weight, of said polyester mixture.

7. A new and useful polyester mixture having particular utility for the production of flexible polyurethane foams having improved water-retentive properties comprising polyesters derived from adipic acid and a mixture of glycols selected from two different groups as herein specified, one of said groups comprising glycols having a molecular weight between 62 and 150, and the other of said groups comprising polyethylene glycols having an average molecular weight between 400 and 600, and up to 10% by weight of the aforesaid glycols of trimethylol propane for cross-linking, said last-mentioned polyethylene glycols constituting from 10% to 30%, by weight, of said polyester mixture.

8. A new and useful polyester mixture having particular utility for the production of flexible polyurethane foams having improved water-retentive properties comprising polyesters derived from adipic acid and a mixture of diethylene glycol and polyethylene glycols having an average molecular weight between 400 and 600, and up to 10% by weight of the aforesaid glycols of trimethylol propane for cross-linking, said last-mentioned polyethylene glycols constituting from 10% to 20%, by weight, of said polyester mixture.

9. A flexible polyurethane foam having good strength and enhanced water-retentive properties derived from the interaction of (a) organic polyisocyanate; (b) polyester prepared from a glycol having a molecular weight between 62 and 150 and dicarboxylic acid containing from 3 to 10 carbon atoms; (c) linear polyester prepared from polyethylene glycol having an average molecular weight of 200 to 1000 and dicarboxylic acid containing from 3 to 10 carbon atoms; and (d) water; said ingredient (c) constituting from 10% to 50%, by weight, of the total of said ingredients (b) and (c).

10. A flexible polyurethane foam having good strength and enhanced water-retentive properties derived from the interaction of (a) organic diisocyanate; (b) polyester prepared from a glycol having a molecular weight between 62 and 150, a dicarboxylic acid containing from 3 to 10 carbon atoms, and up to 10% by weight of the aforesaid glycol of a polyol having at least 3 hydroxy groups for cross-linking; (c) polyester prepared from polyethylene glycol having an average molecular weight of 200 to 1000, aliphatic dicarboxylic acid containing from 3 to 10 carbon atoms, and up to 10% by weight of the aforesaid glycols of a polyol having at least 3 hydroxy groups for cross-linking; and (d) water; said ingredient (c) constituting from 10% to 50%, by weight, of the total of said ingredients (b) and (c).

11. A flexible polyurethane foam having good strength and enhanced water-retentive properties derived from the interaction of (a) tolylene diisocyanate; (b) polyester prepared from diethylene glycol, adipic acid and up to 10% by weight of the diethylene glycol of trimethylol propane for cross-linking; (c) polyester prepared from a polyethylene glycol having an average molecular weight of 300 to 600, adipic acid and up to 10% by weight of the aforesaid glycols of trimethylol propane for cross-linking; and (d) water; said ingredient (c) constituting from 20% to 40%, by weight, of the total of said ingredients (b) and (c).

12. A flexible polyurethane foam having good strength and enhanced water-retentive properties derived from the interaction of (a) organic diisocyanate, (b) a mixture of polyesters derived from glycols selected from two different groups as herein specified, the first of said groups comprising glycols having a molecular weight between 62 and 150, and the second of said groups comprising polyethylene glycols having an average molecular weight between 200 and 1000, each of said esters comprising a reaction product of the specified glycol with dicarboxylic acid containing from 3 to 10 carbon atoms, the second group of glycols constituting from 5% to 35%, by weight, of said polyesters, and (c) water.

13. A flexible polyurethane foam having good strength and enhanced water-retentive properties derived from the interaction of (a) arylene diisocyanate, (b) a mixture of polyesters derived from glycols selected from two different groups as herein specified, the first of said groups comprising glycols having a molecular weight between 62 and 150, and the second of said groups comprising polyethylene glycols having an average molecular weight between 300 and 600, each of said esters comprising a reaction product of the specified glycol with aliphatic dicarboxylic acid containing from 3 to 10 carbon atoms and up to 10% by weight of the aforesaid glycols of polyol having 3 hydroxy groups, the said second group of glycols constituting from 5% to 35%, by weight, of said polyesters, and (c) water.

14. A flexible polyurethane foam having good strength and enhanced water-retentive properties derived from the interaction of (a) tolylene diisocyanate, (b) a mixture of polyesters of diethylene glycol, a polyethylene glycol having an average molecular weight of about 400, adipic acid and up to 10% by weight of the aforesaid glycols of trimethylol propane for cross-linking, said last-mentioned polyethylene glycol constituting from 10% to 20%, by weight, of said polyesters, and (c) water.

15. A prepolymer for use in the preparation of flexible polyurethane foams having good strength and enhanced water-retentive properties by the addition to said prepolymer of water and a catalyst said prepolymer being derived from the interaction of (a) organic polyisocyanate in mol excess in relation to the following polyesters; (b) polyester prepared from a glycol having a molecular weight between 62 and 150 and dicarboxylic acid containing from 3 to 10 carbon atoms; and (c) linear polyester prepared from polyethylene glycol having an average molecular weight of 200 to 1000 and dicarboxylic acid containing from 3 to 10 carbon atoms; said ingredient (c) constituting from 10% to 50%, by weight, of the total of said ingredients (b) and (c).

16. A prepolymer for use in the preparation of flexible polyurethane foams having good strength and enhanced water-retentive properties by the addition to said prepolymer of water and a catalyst, said prepolymer being derived from the interaction of (a) arylene diisocyanate in mol excess in relation to the following polyesters; (b) polyester prepared from a glycol having a molecular weight between 62 and 150, aliphatic dicarboxylic acid containing from 3 to 10 carbon atoms, and up to 10% by weight of the aforesaid glycol of a polyol having at least 3 hydroxy groups for cross-linking; and (c) polyester prepared from polyethylene glycol having an average molecular weight of 200 to 1000, aliphatic dicarboxylic acid containing from 3 to 10 carbon atoms, and up to 10% by weight of the aforesaid glycols of a polyol having at least 3 hydroxy groups for cross-linking; said ingredient (c) constituting from 10% to 50%, by weight, of the total of said ingredients (b) and (c).

17. A prepolymer for use in the preparation of flexible polyurethane foams having good strength and enhanced water-retentive properties by the addition to said prepolymer of water and a catalyst, said prepolymer being derived from the interaction of (a) organic diisocyanate in mol excess in relation to the following polyesters, and (b) a mixture of polyesters derived from glycols selected from two different groups as herein specified, the first of said groups comprising glycols having a molecular weight between 62 and 150, and the second of said groups comprising polyethylene glycols having an average molecular weight between 200 and 1000, each of said esters comprising a reaction product of the specified glycol with dicarboxylic acid containing from 3 to 10 carbon atoms, the second group of glycols constituting from 5% to 35%, by weight, of said polyesters.

18. A prepolymer for use in the preparation of flexible polyurethane foams having good strength and enhanced water-retentive properties by the addition to said prepolymer of water and a catalyst, said prepolymer being derived from the interaction of (a) organic diisocyanate in mol excess in relation to the following polyesters, and (b) a mixture of linear polyesters derived from glycols selected from two different groups as herein specified, the first of said groups comprising glycols having a molecular weight between 62 and 150, and the second of said groups comprising polyethylene glycols having an average molecular weight between 400 and 600, each of said esters comprising a reaction product of the specified glycol with adipic acid and up to 10% by weight of the aforesaid glycols of trimethylol propane, the said second group of glycols constituting from 10% to 30%, by weight, of said polyesters.

References Cited in the file of this patent

UNITED STATES PATENTS

| | | |
|---|---|---|
| 2,621,166 | Schmidt | Dec. 9, 1952 |
| 2,779,689 | Reis | Jan. 29, 1957 |
| 2,894,919 | Simon et al. | July 14, 1959 |
| 2,938,005 | Bick et al. | May 24, 1960 |

FOREIGN PATENTS

| | | |
|---|---|---|
| 745,412 | Great Britain | Feb. 22, 1956 |